(12) United States Patent
Akao et al.

(10) Patent No.: US 9,444,393 B2
(45) Date of Patent: Sep. 13, 2016

(54) MOTOR DRIVING DEVICE

(71) Applicants: ADVICS CO., LTD., Kariya-shi, Aichi-ken (JP); DENSO CORPORATION, Kariya-shi, Aichi (JP)

(72) Inventors: Kazuya Akao, Chiryu (JP); Masatoshi Ota, Chiryu (JP)

(73) Assignees: ADVICS CO., LTD., Aichi-ken (JP); DENSO CORPORATION, Aichi-ken (JP)

( * ) Notice: Subject to any disclaimer, the term of this patent is extended or adjusted under 35 U.S.C. 154(b) by 207 days.

(21) Appl. No.: 14/187,828

(22) Filed: Feb. 24, 2014

(65) Prior Publication Data

US 2014/0239866 A1   Aug. 28, 2014

(30) Foreign Application Priority Data

Feb. 25, 2013   (JP) .................................. 2013-034623

(51) Int. Cl.
| | |
|---|---|
| *H02K 29/06* | (2006.01) |
| *H02P 31/00* | (2006.01) |
| *H02P 29/00* | (2016.01) |
| *H02P 7/285* | (2016.01) |

(52) U.S. Cl.
CPC ............. *H02P 31/00* (2013.01); *H02P 7/2855* (2013.01); *H02P 29/0038* (2013.01)

(58) Field of Classification Search
USPC .................... 318/400.23, 459, 145
See application file for complete search history.

(56) References Cited

U.S. PATENT DOCUMENTS

| | | | | |
|---|---|---|---|---|
| 5,850,129 A | * | 12/1998 | Yoshino | H02P 6/14 318/400.25 |
| 2002/0053890 A1 | * | 5/2002 | Gotou | G11B 19/20 318/400.19 |
| 2004/0080860 A1 | * | 4/2004 | Inaji | G11B 5/59627 360/77.02 |
| 2004/0222758 A1 | * | 11/2004 | Tagome | G11B 19/2054 318/268 |
| 2007/0176588 A1 | * | 8/2007 | Nishida | H02M 3/158 323/284 |
| 2008/0252241 A1 | * | 10/2008 | Yu | H02P 6/142 318/400.14 |

FOREIGN PATENT DOCUMENTS

JP           6-15520 Y2     4/1994

* cited by examiner

*Primary Examiner* — Jorge L Carrasquillo
(74) *Attorney, Agent, or Firm* — Sughrue Mion, PLLC

(57) ABSTRACT

A motor driving device, which controls a rotation number of a brushed motor by outputting a command signal to a motor controller placed in a current supply path, includes: a noise detecting unit including at least one of: a high voltage side noise detecting unit which detects high voltage side noise from brush noise included in the monitor voltage, based on whether a monitor voltage is larger than a first threshold voltage; and a low voltage side noise detecting unit which detects low voltage side noise from the brush noise included in the monitor voltage, based on whether the monitor voltage is smaller than a second threshold voltage; and a calculating unit which outputs the command signal to the motor controller to control the rotation number of the motor to reduce a occurrence number of the brush noise, based on at least one of the occurrence numbers.

5 Claims, 5 Drawing Sheets

MOTOR DRIVING DEVICE

CROSS-REFERENCE TO RELATED APPLICATION

This application claims priority from Japanese Patent Application No. 2013-034623 filed on Feb. 25, 2013, the entire subject matter of which is incorporated herein by reference.

TECHNICAL FIELD

This disclosure relates to a motor driving device which can suppress noise that occurs when a brushed motor is driven.

BACKGROUND

When a brushed motor (referred to as motor only) is driven, brush noise is generated due to the discharge in accordance with the contact between the brush and the commutator, and the noise affect other electronic devices. Since electrical abrasion that is one of the brush abrasions occurs due to the brush noise, the durability decreases. Therefore, as a countermeasure to address the problem of the brush noise, an LC filter or a ferrite element is inserted inside or outside the motor to reduce the noise. For example, in JP-UM-A-6-15520, a structure is adopted in which a resistance or a series circuit of a resistance and a capacitor are connected to the choke coil of a direct winding commutator motor in parallel.

SUMMARY

However, in the above countermeasure to address the brush noise problem, since it is necessary to include the countermeasure elements which are separate components from the motor, there are the problems such as the component number increases, a space where the elements for the countermeasure are arranged is necessary, and the motor is upsized. Therefore, the production cost increases, and it leads to the deterioration of saleability.

In view of the above points, this disclosure provides at least a motor driving device so that even if the elements for the brush noise countermeasure are not included as separate components. Further, the brush noise can be reduced and the electrical abrasion due to the brush noise can be suppressed.

A motor driving device of this disclosure controls a rotation number of a brushed motor by outputting a command signal to a motor controller placed in a current supply path from a power source to the motor and controlling the current supplied to the motor. The motor driving device includes a noise detecting unit including at least one of: a high voltage side noise detecting unit which detects high voltage side noise, which occurs at a high voltage side of an amplitude waveform including a rectification ripple produced by the drive of the motor, from brush noise included in the monitor voltage, based on whether a monitor voltage, which is a terminal voltage of the motor, is larger than a first threshold voltage; and a low voltage side noise detecting unit which detects low voltage side noise, which occurs at a low voltage side of the amplitude waveform, from the brush noise included in the monitor voltage, based on whether the monitor voltage is smaller than a second threshold voltage which is lower than the first threshold voltage; and a calculating unit which outputs the command signal to the motor controller to control the rotation number of the motor to reduce a occurrence number of the brush noise, based on at least one of the occurrence number of the high voltage side noise and the occurrence number of the low voltage side noise.

The noise detecting unit detects the high voltage side noise and the low voltage side noise, and the calculating unit outputs the command signal to the motor controller based on the detected numbers and controls the rotation number of the motor to reduce the occurrence number of the brush noise. Thereby, the rotation number of the motor can be controlled to the rotation number which is most suitable for rectification, and the brush noise can be reduced only by adjusting the rotation number of the motor. Therefore, it is possible to reduce brush noise even if the elements for the brush noise countermeasure are not included as separate components, the brush noise can be reduced and the electrical abrasion due to the brush noise can be suppressed.

In the above-described motor driving device, the noise detecting unit includes both the high voltage side noise detecting unit and the low voltage side noise detecting unit, the rotation number of the motor when a difference between an occurrence number of the high voltage side noise and an occurrence number of the low voltage side noise becomes the smallest or when the difference is less than a predetermined threshold is set at a target rotation number, and the calculating unit outputs a command signal to control the motor to become the target rotation number.

As described above, for example, the target rotation number can be set based on the difference between the occurrence number of the high voltage side noise and the occurrence number of the low voltage side noise. According to controlling the rotation number of the motor to become the target rotation number, at least the intended effect will be obtained.

In the above-described motor driving device, the noise detecting unit has both the high voltage side noise detecting unit and the low voltage side noise detecting unit, the rotation number of the motor is changed in a predetermined rotation number range by the motor controller, wherein, while the rotation number of the motor is changed in the predetermined rotation number range, the calculating unit calculates a change of a difference between an occurrence number of the high voltage side noise and an occurrence number of the low voltage side noise, and the rotation number of the motor when the difference becomes the smallest or when the difference is less than a predetermined threshold is set as the target rotation number, and the calculating unit outputs a command signal to control the motor to become the target rotation number.

As described above, for example, the target rotation number can be set based on the change of the difference between the occurrence number of the high voltage side noise and the occurrence number of the low voltage side noise in the period when the rotation number of the motor is changed in the predetermined rotation number range. According to controlling the rotation number of the motor to become the target rotation number, at least the intended effect will be obtained.

In the above-described motor driving device, the noise detecting unit includes the low voltage side noise detecting unit, the rotation number of the motor is gradually increased from a predetermined rotation number by the motor controller, wherein, while the rotation number of the motor is gradually increased, the rotation number of the motor when an occurrence number of the low voltage side noise becomes the smallest or is less than a predetermined threshold is set as a target rotation number, and the calculating unit outputs a command signal to control the motor to become the target rotation number.

As described above, for example, the target rotation number can be set based on the occurrence number of the low voltage side noise in the period when the rotation number of the motor is gradually increased from the predetermined rotation number. According to controlling the rotation number of the motor to become the target rotation number, at least the intended effect will be obtained.

In the above-described motor driving device, the noise detecting unit includes the high voltage side noise detecting unit, the rotation number of the motor is gradually decreased from a predetermined rotation number by the motor controller, wherein, while the rotation number of the motor is gradually decreased, the rotation number of the motor when an occurrence number of the high voltage side noise become the smallest or is less than a predetermined threshold is set as the target rotation number, and the calculating unit outputs a command signal to control the motor to become the target rotation number As described above, for example, the target rotation number can be set based on the occurrence number of the high voltage side noise in the period when the rotation number of the motor is gradually decreased from the predetermined rotation number. According to controlling the rotation number of the motor to become the target rotation number set, at least the intended effect will be obtained.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Next, illustrative embodiments of this disclosure will be described with reference to the figures. In the following illustrative embodiments, the same or equivalent parts are given the same symbol.

First Illustrative Embodiment

Figure 1:
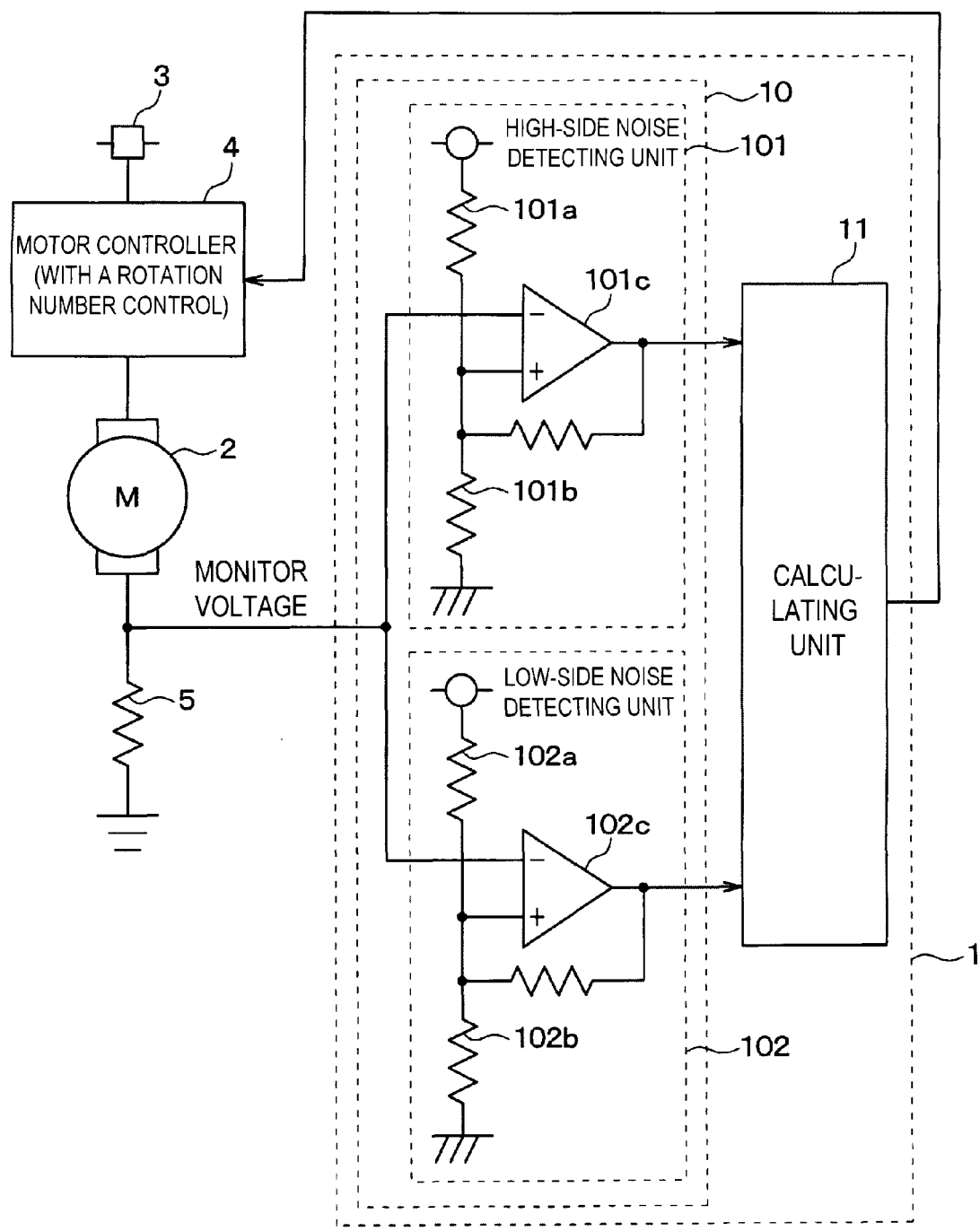
FIG. 1 illustrates the schematic configuration of a driving circuit of a motor driving device and a motor which is driven by the motor driving device, according to a first illustrative embodiment of this disclosure.

The first illustrative embodiment of this disclosure will be described. FIG. 1 illustrates the schematic configuration of a driving circuit of a motor driving device 1 according to the present illustrative embodiment and a motor (brushed motor) which is driven by the motor driving device 1. First, the driving circuit of the motor driving device 1 and the motor 2 will be described with reference to the figures.

The motor driving device 1 is formed of a well-known microcomputer which includes CPU, ROM, RAM, I/O and the like, and controls the motor 2 to become a desired rotation number by controlling the power supplied from a power source 3 to the motor 2 according to a program stored beforehand. For example, the motor 2 may be a driving motor applied to an electric pump (not shown) for controlling brake fluid pressure. In this case, when an anti-skid control is performed, the brake fluid exhausted from the wheel cylinder of the target wheel is returned to the master cylinder side by a pump action based on the drive of the motor 2. When an electronic stability control or a traction control is performed, the brake fluid from the master cylinder side is transferred by a pump action based on the drive of the motor 2, and the wheel cylinder of the target wheel is pressurized. The motor that drives the electric pump for controlling brake fluid pressure is illustrated as an application of the motor 2, but of course the motor 2 is not limited to this, and may be applicable in other applications.

The motor driving device 1 controls the power supplied to the motor 2 by controlling a motor controller 4 which is included in the power supply path of the motor 2. In the present illustrative embodiment, a high-side driving circuit is used in which the motor controller 4 is connected to the high-side of the motor 2. The power supplied to the motor 2 is controlled when the motor controller 4 is controlled at the high-side of the motor 2. Specifically, when a command signal is output to the motor controller 4, the electric current supplied to the motor 2 is controlled by the motor controller 4, and thus the rotation number of the motor 2 is controlled.

The motor controller 4 may be other elements which can control the electric current supplied to the motor 2 based on the command signal, such as a switching element such as an MOS transistor or a current adjusting resistance which is formed of a variable resistor. For example, when the motor controller 4 is formed of an MOSFET, by controlling a gate voltage applied to the gate of the MOS transistor, the MOS transistor is switched on/off to control the electric current supplied to the motor 2.

The motor driving device 1 monitors either the low-side voltage or the high-side voltage of the motor 2, that is, a terminal voltage. In the present illustrative embodiment, a resistance 5 is included to be serially connected to the motor 2 at the low-side of the motor 2, the motor driving device 1 is input the electric potential at the low-side of the motor 2 or the electric potential of the connecting point where the motor 2 and the resistance 5 are connected as a monitor voltage. In the present illustrative embodiment, the monitor voltage becomes an electric potential corresponding to the voltage drop of the resistance 5 due to the electrical current supplied to the motor 2, and is an electric potential on which the brush noise is superimposed. That becomes an electric potential corresponding to the electric current supplied to the motor 2.

Therefore, the motor driving device 1 can grasp the brush noise in addition to the state of power supplied to the motor 2 by inputting the monitor voltage. Based on the brush noise superimposed on the monitor voltage, the motor driving device 1 detects a rotation number that is most suitable for rectification for the motor 2 (referred to as a target rotation number) or a command signal corresponding to the target rotation number. The motor driving device 1 controls the motor 2 to the desired rotation number by controlling the motor controller 4 and reduces the brush noise.

Specifically, a noise detecting unit 10 and a calculating unit 11 are included in the motor driving device 1. The noise detecting unit 10 detects the brush noise based on the input monitor voltage. In this illustrative embodiment, the noise detecting unit 10 has a high-side noise detecting unit 101 which detects the noise that occurs at the high voltage side (referred to as high-side noise), and a low-side noise detecting unit 102 which detects the noise that occurs at the low voltage side (hereinafter referred to as low-side noise).

The high-side noise detecting unit 101 detects the noise that occurs at the high voltage side of the amplitude waveform of the monitor voltage (referred to as high-side noise) from the brush noise superposed on the amplitude waveform. The low-side noise detecting unit 102 detects the noise that occurs at the low voltage side of the amplitude waveform of the monitor voltage (referred to as low-side noise) from the brush noise.

The high-side noise detecting unit 101 has voltage dividing resistances 101a, 101b and a comparator 101c. While the monitor voltage is input into the inverting input terminal, a first threshold voltage Vth1 generated by the voltage dividing resistances 101a, 101b is input into the non-inverting input terminal, and these voltages are compared. A detection signal depending on the result of the comparison is output to the calculating unit 11. The low-side noise detecting unit 102 also has voltage dividing resistances 102a, 102b and a comparator 102c. While the monitor voltage is input into the inverting input terminal, a second threshold voltage Vth2 generated by the voltage dividing resistances 102a, 102b is input into the non-inverting input terminal, and these voltages are compared. A detection signal depending on the result of the comparison is output to the calculating unit 11.

The first threshold voltage Vth1 is a threshold to judge that the brush noise that occurs at the high voltage side of the amplitude waveform of the monitor voltage is occurring, and the first threshold voltage Vth1 is set as a voltage larger than the voltage assumed as the amplitude waveform and lower than the voltage of the brush noise that occurs at the high voltage side. The second threshold voltage Vth2 is a threshold to judge that the brush noise that occurs at the low voltage side of the amplitude waveform of the monitor voltage is occurring, and the second threshold voltage Vth2 is set as a voltage smaller than the voltage assumed as the amplitude waveform and higher than the voltage of the brush noise that occurs at the low voltage side. Therefore, for the high-side noise detecting unit 101, at a time point when a high-side noise occurs, the monitor voltage becomes higher than the first threshold voltage Vth1 so that the output level of the comparator 101c changes, and the change is input into the calculating unit 11. Further, for the low-side noise detecting unit 102, at a time point when a low-side noise occurs, the monitor voltage becomes lower than the second threshold voltage Vth2 so that the output level of the comparator 102c changes, and the change is input into the calculating unit 11.

The calculating unit 11 controls the motor controller 4 based on the detection result of the brush noise from the noise detecting unit 10 so that the motor 2 is driven with the target rotation number, and the brush noise is reduced. In the present illustrative embodiment, the calculating unit 11 is input the output signals from the high-side noise detecting unit 101 and the low-side noise detecting unit 102, and based on the detection numbers of the high-side noise and the low-side noise, calculates to increase or decrease the rotation number of the motor 2 to the target rotation number of the motor 2. Based on the calculation result, the motor controller 4 is controlled and the electric current supplied to the motor 2 is controlled so that the motor 2 becomes the target rotation number. Thereby, the motor 2 can be controlled to become the target rotation number, and even if the elements for the brush noise countermeasure are not included as separate components, the brush noise can be reduced and the electrical abrasion due to the brush noise can be suppressed.

Next, it will be described in detail that the motor 2 is driven by the motor driving device 1 according to the present illustrative embodiment. At a timing when the motor 2 is driven, for example, when the above anti-skid control, the electronic stability control or traction control is performed, the motor driving device 1 of the present illustrative embodiment outputs a command signal to the motor controller 4 and drives the motor 2. When the motor is driven, brush noise is detected based on the monitor voltage, and the rotation number that is most suitable for rectification for the motor 2 is calculated based on the detection result, and the motor controller 4 is controlled so that the motor 2 becomes the target rotation number.

Figure 2:
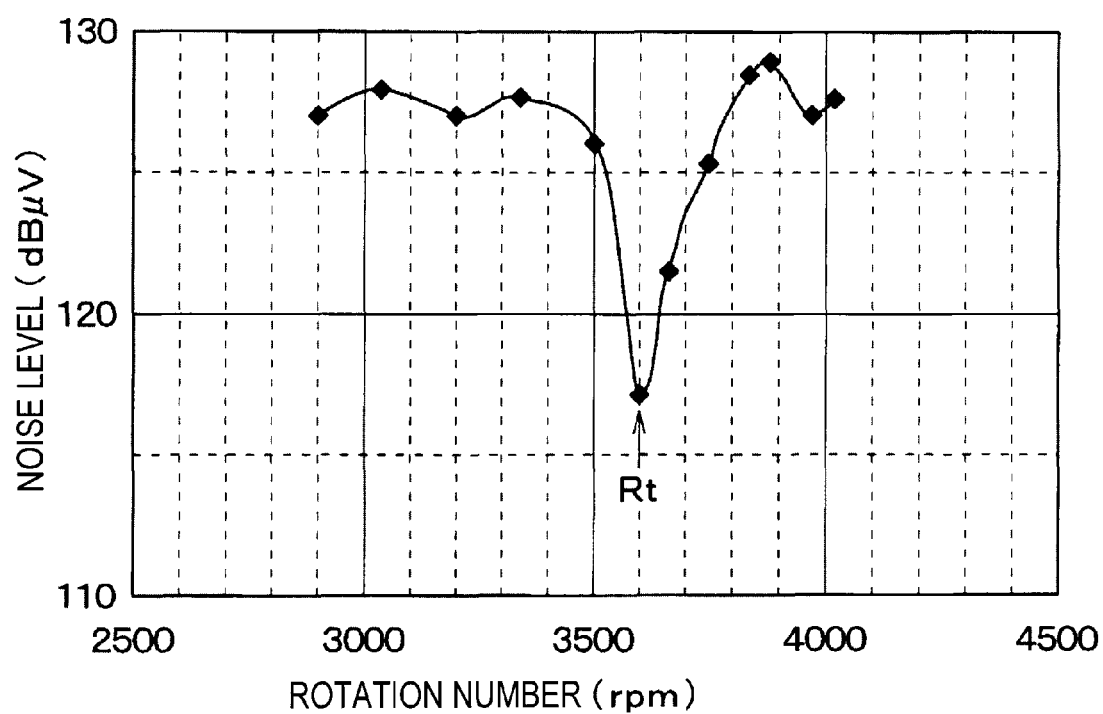
FIG. 2 illustrates the change of the noise level of the brush noise when the motor is driven with changing of the rotation number.

FIG. 2 illustrates the change of the noise level of the brush noise when the motor 2 is driven with changing the rotation number changed. As shown in this figure, the noise level decreases in a specific range of rotation number, and the noise level becomes higher for the rotation number lower or higher than the specific range of rotation number. By comparison, the brush noise for the specific range of rotation number is about 10 dB less than the brush noise for the rotation number lower or higher than the range of rotation number. The rotation number for the specific range, particularly the rotation number for which the brush noise decreases most is the rotation number most suitable for rectification, or the target rotation number. However, the target rotation number changes depending on the driving situation of the motor 2 such as temperature or load, and may be not a constant value.

Figure 3A:
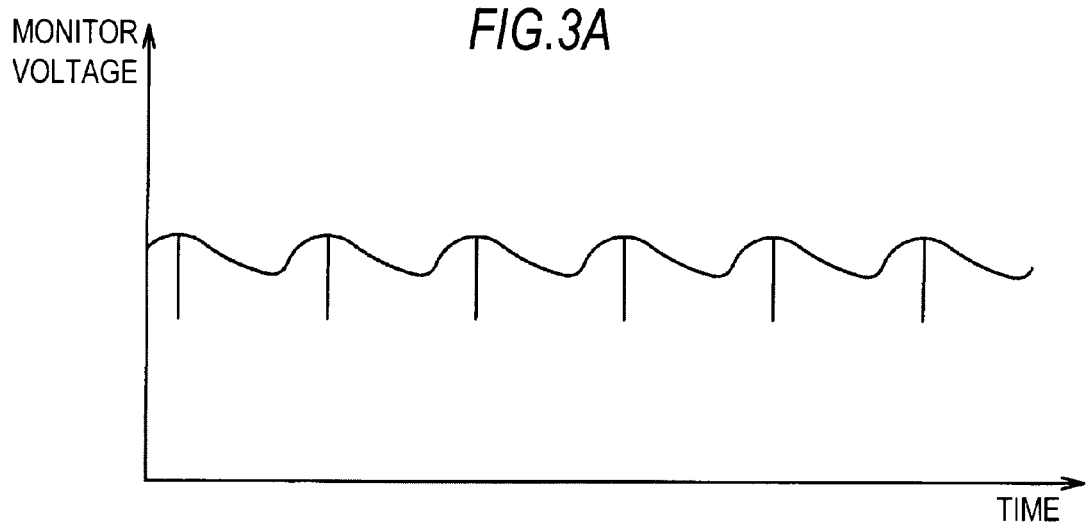
FIG. 3A illustrates a monitor voltage waveform for a rotation number Rlow, which is lower than a specific range of rotation number in which the noise level decreases.
Figure 3B:
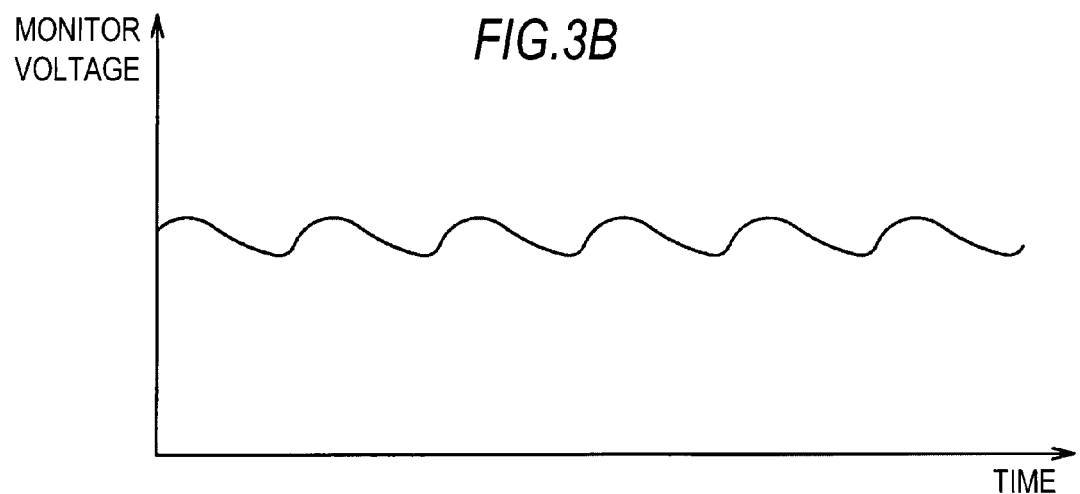
FIG. 3B illustrates a monitor voltage waveform for a target rotation number Rt.
Figure 3C:
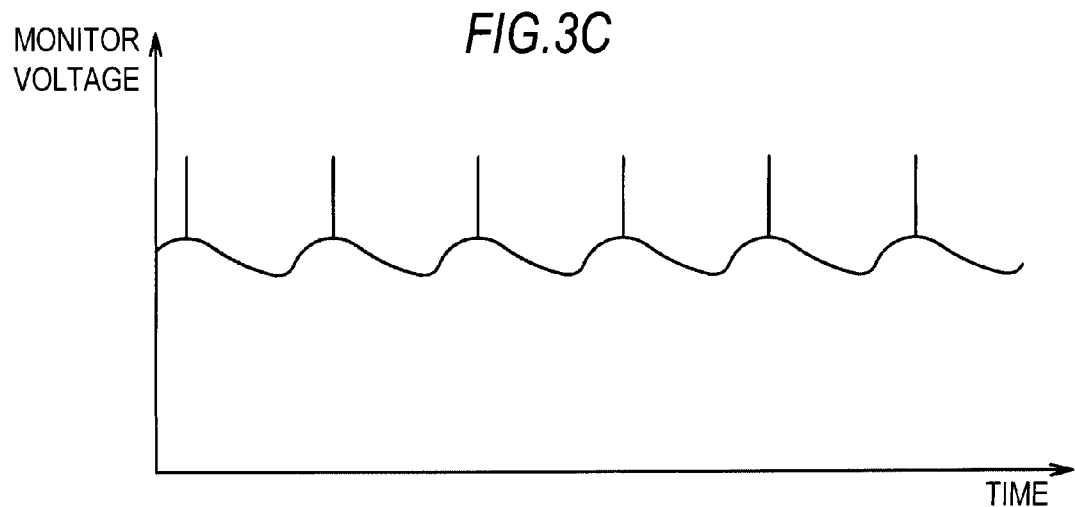
FIG. 3C illustrates a monitor voltage waveform for a rotation number Rhigh, which is higher than a specific range of rotation number in which the noise level decreases.

For example, monitor voltage waveforms for a low rotation number Rlow which is lower than the specific range of rotation number in which the noise level decreases, a target rotation number Rt, and a high rotation number Rhigh which is higher than the specific range of rotation number are shown in FIG. 3A to FIG. 3C. That is, since the contact state of the brush and the commutator changes with the turn of the motor 2, the monitor voltage waveform basically becomes an amplitude waveform in which rectification ripple is produced according to the contact state, and is a waveform in which the brush noise is superimposed on the amplitude waveform. For the rotation number Rlow, the brush noise superimposed on the monitor voltage is the low-side noise which occurs at the low voltage side of the amplitude waveform, and for the rotation number Rhigh, the brush noise superimposed on the monitor voltage is the high-side noise which occurs at the high voltage side of the amplitude waveform. For the target rotation number Rt, the brush noise superimposed on the monitor voltage almost disappears, and there is substantially only the amplitude waveform.

Accordingly, the brush noise in the target rotation number Rt is the smallest, and the polarity of the voltage produced by the brush noise is reversed with respect to the rotation number to be higher or lower than the target rotation number Rt, relative to the amplitude waveform. Therefore, in case of the rotation number Rlow, the low-side noise is more than the high-side noise, in case that the target rotation number Rt, the low-side noise and the high-side noise will not occur so that the difference between the low-side noise and the high-side noise is reduced, and in case of the rotation number Rhigh, the high-side noise is more than the low-side noise. In view of this phenomena, the target rotation number Rt which is most suitable for rectification is calculated, and it is determined to increase or decrease the electric current which is supplied to the motor 2 through the motor controller 4 to become closer to the target rotation number Rt.

Specifically, in the present illustrative embodiment, when the motor 2 is started to be driven, the motor 2 is driven with an arbitrary rotation number, and it is not known whether the rotation number is larger than or smaller than the target rotation number Rt. Therefore, a difference between detection numbers of the high-side noise and the low-side noise per unit time with the rotation number at the start of the drive is obtained, and it is determined to increase or decrease the rotation number of the motor 2 based on the difference.

Figure 4A:
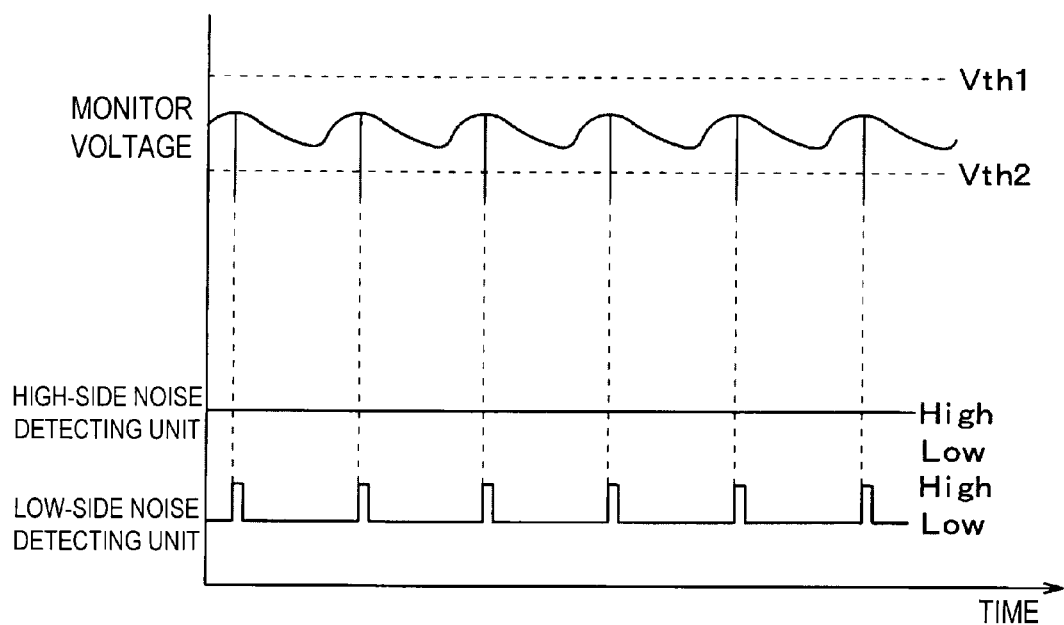
FIG. 4A is a time chart illustrating the monitor voltage waveform and output signals of a high-side noise detecting unit and a low-side noise detecting unit for the rotation number Rlow.
Figure 4B:
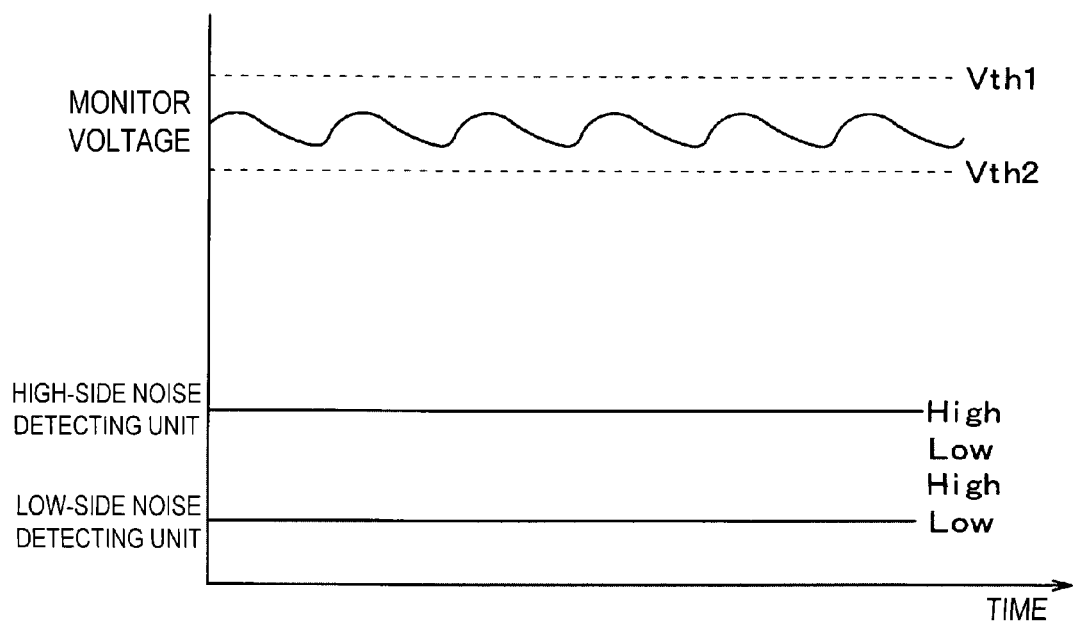
FIG. 4B is a time chart illustrating the monitor voltage waveform and output signals of the high-side noise detecting unit and the low-side noise detecting unit for the target rotation number Rt.
Figure 4C:
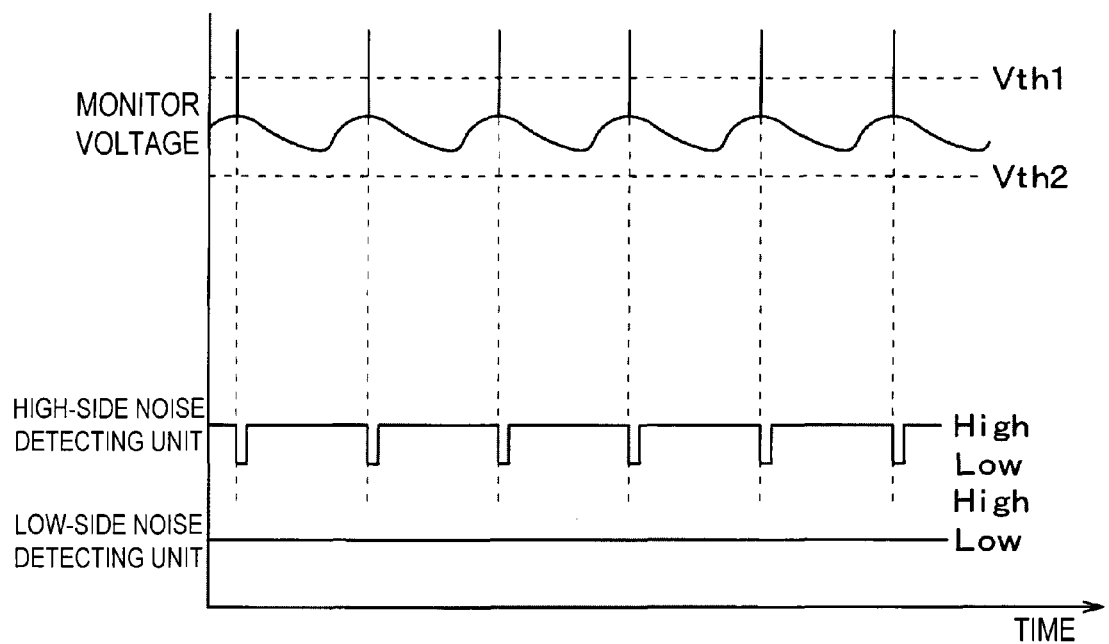
FIG. 4C is a time chart illustrating the monitor voltage waveform and output signals of the high-side noise detecting unit and the low-side noise detecting unit for the rotation number Rhigh.

Specifically, the output signals of the high-side noise detecting unit 101 and the low-side noise detecting unit 102 for the rotation number Rlow, the target rotation number Rt and the rotation number Rhigh are shown as the timing charts of FIG. 4A to FIG. 4C, respectively. Therefore, for example, by counting the numbers of edges when the voltage levels of the output signals of the noise detecting units 101, 102 change, and calculating the difference between the counted numbers, it is determined whether the rotation number of the motor 2 is larger or smaller than the target rotation number Rt. When the low-side noise is more than the high-side noise and the rotation number of the motor 2 is smaller than the target rotation number Rt, in order to increase the rotation number of the motor 2, a command signal to increase the electric current supplied to the motor 2 through the motor controller 4 is output, and the rotation number of the motor 2 is increased. On the contrary, when the high-side noise is more than the low-side noise and the rotation number of the motor 2 is larger than the target rotation number Rt, in order to decrease the rotation number of the motor 2, a command signal to decrease the electric current supplied to the motor 2 through the motor controller 4 is output, and the rotation number of the motor 2 is decreased.

The above action is performed repeatedly, and the rotation number of the motor 2 is controlled to get closer to the target rotation number Rt. For example, when the difference between the above counted number reaches the minimum or when the difference between the counted numbers becomes less than a predetermined threshold, it is determined that rotation number is reached to the target rotation number Rt, and the electric current supplied to the motor 2 is fixed. Thereby, it is possible to drive the motor 2 with the target rotation number Rt. Regarding the difference between the counted numbers being the minimum, the change of the difference between the counted numbers when the electric current supplied to the motor 2 is changed is recognized, and the time when the difference between the counted numbers starts to increase after it has decreased may be stored.

As described above, by controlling the rotation number of the motor 2 to the target rotation number Rt which is most suitable for rectification, the brush noise can be reduced only by adjusting the rotation number of the motor 2. Therefore, it is possible for the motor driving device 1 that even if the elements for the brush noise countermeasure are not included as separate components, the brush noise can be reduced and the electrical abrasion due to the brush noise can be suppressed.

Second Illustrative Embodiment

The second illustrative embodiment of this disclosure will be described. Since, in the present illustrative embodiment, the method of detecting the target rotation number Rt is different from that of the first illustrative embodiment and other parts are similar to those of the first illustrative embodiment, only the part different from the first illustrative embodiment is described.

In the present illustrative embodiment, because the value assumed as the target rotation number Rt of the motor 2 is included in a predetermined rotation number range, the rotation number of the motor 2 is changed within the range, and based on the change of the brush noise at that time, the motor 2 will be driven by the target rotation number Rt.

For example, the calculating unit 11 first outputs a command signal so that an electric current corresponding to the lower limit value of the predetermined rotation number range is supplied to the motor 2, then the electric current supplied to the motor 2 is gradually increased until an electric current corresponding to the upper limit value of the predetermined rotation number range is supplied to the motor 2. During the period, the noise detecting unit 10 detects the brush noise based on the monitor voltage, and the calculating unit 11 calculates the detected numbers of the high-side noise and the low-side noise per unit hour and calculates a difference between the detected numbers of the high-side noise and the low-side noise. For example, like the first illustrative embodiment, the numbers of edges when the voltage levels of the output signals of the noise detecting units 101, 102 change are counted, and a difference between the counted numbers is calculated. The difference between the detected numbers of the noises is stores, and if the difference becomes the smallest or less than a predetermined threshold, the rotation number of the motor 2 at that time is stored as the target rotation number Rt. Then, the electric current supplied to the motor 2 is controlled based on a command signal from the calculating unit 11, and the motor 2 becomes the target rotation number Rt.

Thus, it is also preferable that the rotation number of the motor 2 is changed in a predetermined rotation number range, and the rotation number of the motor 2 when the difference between the detected numbers of the high-side noise and the low-side noise becomes the smallest in the change range is stored as the target rotation number Rt. Thereby, the same effect as the first illustrative embodiment can be obtained.

Third Illustrative Embodiment

The third illustrative embodiment of this disclosure will be described. Since, in the present illustrative embodiment, the method of detecting the target rotation number Rt is different from that of the first illustrative embodiment, and other parts are similar to those of the first illustrative embodiment, only the part different from the first illustrative embodiment is described.

In this illustrative embodiment, it is detected based only on the low-side noise that the motor 2 becomes the target rotation number Rt. In the present illustrative embodiment, a motor driving device 1 of the configuration like the first illustrative embodiment can be applied, but because only the low-side noise can be detected, it is preferable that the motor driving device 1 may have such a configuration that the noise detecting unit 10 in FIG. 1 includes only the low-side noise detecting unit 102 and does not include the high-side noise detecting unit 101.

Specifically, since the value assumed as the target rotation number Rt of the motor 2 is included in a predetermined rotation number range, the rotation number of the motor 2 is increased from the lower limit value of the range, and the motor 2 will be driven by the target rotation number Rt based on the change of the brush noise at that time.

For example, after the calculating unit 11 outputs a command signal so that an electric current corresponding to the lower limit value of the predetermined rotation number range is supplied to the motor 2, the electric current supplied to the motor 2 is gradually increased. During the period, the noise detecting unit 10 detects the brush noise based on the monitor voltage, and the calculating unit 11 calculates the detected numbers of the low-side noise per unit hour. For example, the number of edges when the voltage level of the output signal of the low-side noise detecting unit 102 changes is counted. If the detected number of the low-side noise becomes the smallest or less than a predetermined threshold, the rotation number of the motor 2 at that time is stored as the target rotation number Rt. Then, the electric current supplied to the motor 2 is controlled based on a command signal from the calculating unit 11, and the motor 2 becomes the target rotation number Rt.

Thus, the rotation number of the motor 2 is gradually increased in a predetermined rotation number range, and the electric current supplied to the motor 2 is fixed when the detected number of the low-side noise becomes the smallest during the increase period. Thereby, it is possible to drive the motor 2 with the target rotation number Rt. Thereby, the same effect as the first illustrative embodiment can be obtained.

Fourth Illustrative Embodiment

The fourth illustrative embodiment of this disclosure will be described. Because in the present illustrative embodiment, the method of detecting the target rotation number Rt is different from that of the first illustrative embodiment, and other parts are similar to those of the first illustrative embodiment, only the part different from the first illustrative embodiment is described.

In this illustrative embodiment, it is detected based only on the high-side noise that the motor 2 becomes the target rotation number Rt. In the present illustrative embodiment, a motor driving device 1 similarly to that of the first illustrative embodiment can be applied, but because only the high-side noise can be detected, it is preferable that the motor driving device 1 may have such a configuration that the noise detecting unit 10 in FIG. 1 includes only the high-side noise detecting unit 101 and does not include the low-side noise detecting unit 102.

Specifically, since the value assumed as the target rotation number Rt of the motor 2 is included in a predetermined rotation number range, the rotation number of the motor 2 is decreased from the upper limit value of the range, and the motor 2 will be driven by the target rotation number Rt based on the change of the brush noise at that time.

For example, after the calculating unit 11 outputs a command signal so that an electric current corresponding to the upper limit value of the predetermined rotation number range is supplied to the motor 2, the electric current supplied to the motor 2 is gradually decreased. During the period, the noise detecting unit 10 detects the brush noise based on the monitor voltage, and the calculating unit 11 calculates the detected numbers of the high-side noise per unit hour. For example, the number of edges when the voltage level of the output signal of the high-side noise detecting unit 101 changes is counted. If the detected number of the high-side noise becomes the smallest or less than a predetermined threshold, the rotation number of the motor 2 at that time is stored as the target rotation number Rt. Then, the electric current supplied to the motor 2 is controlled based on a command signal from the calculating unit 11, and the motor 2 becomes the target rotation number Rt.

Thus, the rotation number of the motor 2 is gradually decreased in a predetermined rotation number range, and the electric current supplied to the motor 2 is fixed when the detected number of the high-side noise becomes the smallest during the decrease period. Thereby, it is possible to drive the motor 2 with the target rotation number Rt. Thereby, the same effect as the first illustrative embodiment can be obtained.

Other Illustrative Embodiments

This disclosure is not limited to the above described illustrative embodiments, and may be changed appropriately in the range.

For example, in the second illustrative embodiment, when the motor 2 is driven, the rotation number is changed from the lower limit value to the upper limit value of the predetermined rotation number assumed as the target rotation number Rt of the motor 2, but it is also possible to change from the upper limit value to the lower limit value.

Further, the position where the motor controller 4, which is included in the current supply path from the power source 3 to the motor 2, is placed may be changed from that in the first illustrative embodiment. That is, in the above illustrative embodiments, a high-side drive example is illustrated in which the motor controller 4 is placed at the high-side of the motor 2, but a low-side drive is also possible in which the motor controller 4 is placed at the low side. Furthermore, the electric potential at the low-side of the motor 2 is used as the monitor voltage, but the electric potential at the high-side may be used as the monitor voltage.

What is claimed is:

1. A motor driving device, which controls a rotation number of a brushed motor by outputting a command signal to a motor controller placed in a current supply path from a power source to the motor and configured to control current supplied to the motor, comprising:

a noise detecting unit comprising at least one of:

a high voltage side noise detecting unit configured to detect high voltage side noise, which occurs at a high voltage side of an amplitude waveform including a rectification ripple produced by drive of the motor, from brush noise included in a monitor voltage, based on whether the monitor voltage, which is a terminal voltage of the motor, is larger than a first threshold voltage; and a low voltage side noise detecting unit configured to detect low voltage side noise, which occurs at a low voltage side of the amplitude waveform, from the brush noise, based on whether the monitor voltage is smaller than a second threshold voltage which is lower than the first threshold voltage; and a calculating unit configured to output the command signal to the motor controller to control the rotation number of the motor to reduce an occurrence number of the brush noise, based on at least one of an occurrence number of the high voltage side noise and an occurrence number of the low voltage side noise.

2. The motor driving device according to claim 1, wherein the noise detecting unit comprises both the high voltage side noise detecting unit and the low voltage side noise detecting unit, wherein the rotation number of the motor is set at a target rotation number when a difference between the occurrence number of the high voltage side noise and the occurrence number of the low voltage side noise becomes the smallest or when the difference is less than a predetermined threshold, and wherein the calculating unit is configured to output the command signal to control the motor to rotate at the target rotation number.

3. The motor driving device according to claim 1, wherein the noise detecting unit comprises both the high voltage side noise detecting unit and the low voltage side noise detecting unit, wherein the motor controller is configured to change the rotation number of the motor in a predetermined rotation number range, wherein, while the rotation number of the motor is changed in the predetermined rotation number range, the calculating unit is configured to calculate a change of a difference between the occurrence number of the high voltage side noise and the occurrence number of the low voltage side noise, and the rotation number of the motor is set as a target rotation number when the difference becomes the smallest or when the difference is less than a predetermined threshold, and wherein the calculating unit is configured to output the command signal to control the motor to rotate at the target rotation number.

4. The motor driving device according to claim 1, wherein the noise detecting unit comprise the low voltage side noise detecting unit, wherein the motor controller is configured to gradually increase the rotation number of the motor from a predetermined rotation number, wherein, while the rotation number of the motor is gradually increased, the rotation number of the motor is set as a target rotation number when the occurrence number of the low voltage side noise becomes the smallest or is less than a predetermined threshold, and wherein the calculating unit is configured to output the command signal to control the motor to rotate at the target rotation number.

5. The motor driving device according to claim 1, wherein the noise detecting unit comprises the high voltage side noise detecting unit, wherein the motor controller is configured to gradually decrease the rotation number of the motor from a predetermined rotation number, wherein, while the rotation number of the motor is gradually decreased, the rotation number of the motor is set as a target rotation number when an occurrence number of the high voltage side noise become the smallest or is less than a predetermined threshold, and wherein the calculating unit is configured to output the command signal to control the motor to rotate at the target rotation number.

* * * * *